United States Patent [19] … [11] Patent Number: 4,997,324
Shirai et al. … [45] Date of Patent: Mar. 5, 1991

[54] SPINDLE STRUCTURE FOR MACHINE TOOL

[75] Inventors: Kazuo Shirai; Takeo Maruyama, both of Numazu, Japan

[73] Assignee: Toshiba Kikai Kabushiki Kaisha, Tokyo, Japan

[21] Appl. No.: 471,063

[22] Filed: Jan. 29, 1990

Related U.S. Application Data

[63] Continuation of Ser. No. 340,531, Apr. 19, 1989.

[30] Foreign Application Priority Data

Apr. 21, 1988 [JP] Japan .................................. 63-99239

[51] Int. Cl.$^5$ .......................... B23C 1/06; B23B 39/02; F16C 33/24
[52] U.S. Cl. ...................................... 409/231; 384/42; 384/913; 408/238
[58] Field of Search ............... 409/231, 232, 235, 239, 409/135; 389/42, 276, 907.1, 913, 112, 113, 912; 408/238, 239 R; 51/166 MH, 135.5 R; 428/627, 628; 420/441

[56] References Cited

U.S. PATENT DOCUMENTS 4,019,899  4/1977  Negishi ............................... 420/441
4,066,451  1/1978  Rudy .................................... 419/15
4,334,926  6/1982  Futamura et al. ............... 384/913 X
4,522,453  6/1985  Lammer et al. ...................... 384/42
4,812,057  3/1989  Kuhn et al. .......................... 384/42
4,855,188  8/1989  Garg .................................... 428/627

FOREIGN PATENT DOCUMENTS 61437    4/1982   Japan ..................................... 384/42
59-219469 12/1984  Japan .
1136747  6/1986  Japan .................................. 409/231
156634   6/1988  Japan ............................... 384/907.1
235720   9/1988  Japan ............................... 384/907.1
206250  12/1967  U.S.S.R. .............................. 384/42
2137123 10/1984  United Kingdom ................ 409/231

Primary Examiner—William Briggs
Attorney, Agent, or Firm—Banner, Birch, McKie & Beckett

[57] ABSTRACT

A spindle structure for a machine tool such as a boring machine, for example, includes a rotatable tubular shaft to be coupled to a rotative drive source, and a spindle axially slidably disposed in the tubular shaft and rotatable in unison with the tubular shaft. Bushings with powder on WC-base cemented carbide thermally sprayed on inner peripheral surfaces thereof are disposed between the tubular shaft and the spindle to prevent fretting corrosion. The WC-base cemented carbide comprises 12~18 wt % of Co, 4~6 wt % of C, 0.1~1.2 wt % of Fe, and 75~84 wt % of W.

4 Claims, 1 Drawing Sheet

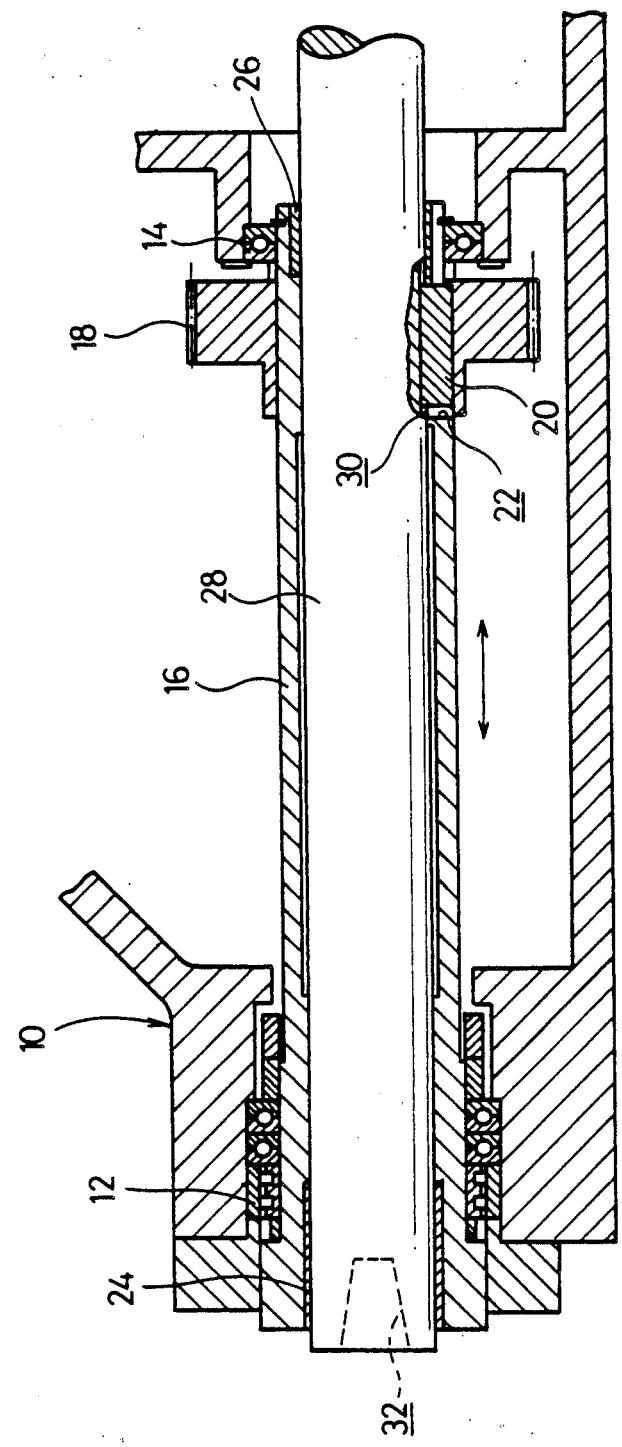

SPINDLE STRUCTURE FOR MACHINE TOOL

This application is a continuation of application Ser. No. 07/340,531, filed Apr. 19, 1989, abandoned.

BACKGROUND OF THE INVENTION

The present invention relates to a spindle structure for a machine tool, and more particularly to a spindle structure for a machine tool, having a rotatable tubular shaft and a spindle axially slidably disposed in and rotatable in unison with the tubular shaft, the spindle structure having means for preventing abnormal wear from occurring on sliding surfaces of the tubular shaft and the spindle There are widely used machine tools having a spindle with a cutting tool attached and a rotatable tubular shaft coupled to a rotative drive source, the spindle being axially slidably disposed in and rotatable in unison with the tubular shaft.

The machine tools suffer from a problem in that fretting corrosion is produced on sliding surfaces of the spindle and tubular shaft. It has been customary to avoid such fretting corrosion by carburizing and quenching or nitriding an inner peripheral surface of the tubular shaft which is slidably held against the spindle, or by placing a bushing made of cast bronze or a bushing with a thermally sprayed layer of powder of Mo, in the tubular shaft by shrink fit or cooling fit and thermally treating the spindle by carburizing and quenching or nitriding, or by selecting a suitable combination of materials of the spindle and the tubular shaft. Another method has been to supply oil under pressure to the sliding surfaces of the spindle and tubular shaft for preventing fretting corrosion.

While the spindle is rotating at a low or medium speed, any fretting corrosion can be prevented from occurring by employing the conventional heat treatment process or a combination of suitable materials. However, inasmuch as the rotational speed of machine tool spindles goes higher in recent years, the problem of fretting corrosion cannot fully be prevented by the measures heretofore available.

With oil supplied under pressure to the siding surfaces of the spindle and tubular shaft, the amount of heat produced by shearing of the oil becomes greater as the spindle rotates at a higher speed. Therefore, a device for cooling the oil is required to be larger in capacity, resulting in a higher cost.

SUMMARY OF THE INVENTION

It is a major object of the present invention to provide a spindle structure for a machine tool, which prevents fretting corrosion from being developed on sliding surfaces of a spindle and a tubular shaft when the spindle rotates at a higher speed by selecting materials of the sliding surfaces of the spindle and tubular shaft.

Another object of the present invention is to provide a spindle structure for a machine tool, comprising a rotatable tubular shaft adapted to be coupled to a rotative drive source, and a spindle axially slidably disposed in the tubular shaft and rotatable in unison with the tubular shaft, the tubular shaft and the spindle being slidably held against each other through a layer of WC-base cemented carbide.

Still another object of the present invention is to provide a spindle structure further further including a bushing of steel interposed between the spindle and the tubular shaft, the bushing having a peripheral sliding surface with powder of the WC-base cemented carbide thermally sprayed thereon.

Yet another object of the present invention is to provide a spindle structure wherein the spindle has an outer peripheral surface slidably held against the tubular shaft and having powder of the WC-base cemented carbide thermally sprayed thereon.

A further object of the present invention is to provide a spindle structure wherein the tubular shaft has an inner peripheral surface slidably held against the spindle and having powder of the WC-base cemented carbide thermally sprayed thereon.

A still further object of the present invention is to provide a spindle structure wherein the WC-base cemented carbide comprises 12~18 wt % of Co, 4~6 wt % of C, 0.1~1.2 wt % of Fe, and 75~84 wt % of W.

The above and other objects, features and advantages of the present invention will become more apparent from the following description when taken in conjunction with the accompanying drawing in which a preferred embodiment of the present invention is shown by way of illustrative example.

BRIEF DESCRIPTION OF THE DRAWING

The sole FIGURE is a fragmentary cross-sectional view of a boring machine incorporating a spindle structure according to the present invention.

DETAILED DESCRIPTION OF THE PREFERRED EMBODIMENT

The sole FIGURE shows a boring machine having a spindle structure of the present invention, the machine tool including a spindle head 10 in which a tubular shaft 16 is rotatably supported by means of front and rear bearings 12, 14. A gear 18 is mounted on the tubular shaft 16 near the rear bearing 14 and held in mesh with a gear train coupled to a rotative drive source (not shown). A key 20 is disposed in an inner peripheral surface of the gear 18 and extends radially inwardly through an opening 22 defined in the tubular shaft 16.

Bushings 24, 26 are placed, by shrink fit or cooling fit, in the respective opposite ends of the tubular shaft 16 in regions where the tubular shaft 16 slidably engages a spindle (described later), each of the bushings 24, 26 having a thermally sprayed layer of WC-base cemented carbide powder on its inner peripheral surface. More specifically, each of the bushings 24, 26 is produced by thermally spraying, on a base member of steel, WC-base cemented carbide powder composed of 12~18 wt % of Co, 4~6 wt % of C, 0.1~1.2 wt % of Fe, and 75~84 wt % of W to a thickness ranging from 0.2 to 0.3 mm, and then finishing the layer to a thickness ranging from 0.1 to 0.15 mm.

A spindle 28 is disposed in the tubular shaft 16. A key slot 30 is defined axially in an outer peripheral surface of the spindle 28, and the key 20 in the gear 28 is fitted in the key slot 30. The spindle 28 has a hole 32 defined in its front tip end for attaching a tool (not shown). The spindle 28 is axially movable in the tubular shaft 16 by a displacing means coupled to the rear end of the spindle 28. The outer peripheral surface of the spindle 28 is carburized and quenched or nitrided.

The boring machine incorporating the spindle structure of the present invention is basically constructed as described above. Operation and advantages of the boring machine and the spindle structure will be described below.

When the gear 18 is rotated by the rotative drive source (not shown), the tubular shaft 16 on which the gear 18 is mounted and the spindle 28 with the key 20 of the gear 18 being fitted in the key slot 30 are rotated in unison with each other. The displacing means (not shown) is actuated to axially displace the spindle 28 in the directions indicated by the arrow. Therefore, while the spindle 28 and the tubular shaft 16 are being rotated together through the key 20, the spindle 28 is axially moved independently of the tubular shaft 16. The tool (not shown) attached to the front tip end of the spindle 28 then machines a workpiece (not shown) held on the boring machine.

If the spindle and the tubular shaft were made of a conventional combination of materials, when the spindle is rotated at a speed of 2,000 RPM, fretting corrosion would be produced on the sliding surfaces of the spindle and tubular shaft in 20 hours of continuous operation of the boring machine. According to the illustrated embodiment, however, since the bushings 24, 26 with the WC-base cemented carbide powder thermally sprayed on their inner peripheral surfaces are interposed between the sliding surfaces of the spindle 28 and tubular shaft 16, no trace of fretting corrosion was recognized after 50 hours of continuous rotation at 2,000 RPM.

While the bushings 24, 26 with the WC-base cemented carbide powder thermally sprayed on their inner peripheral surfaces are fixed to the tubular shaft 16 in the illustrated embodiment, the bushings 24, 26 may be dispensed with and the WC-base cemented carbide powder may be thermally sprayed directly on inner peripheral surfaces of the tubular shaft 16 or outer peripheral surfaces of the spindle 28.

With the present invention, as described above, even when the spindle 28 is rotated at a high speed continuously for a long period of time, no fretting corrosion is developed on the sliding surface of the spindle 28.

Although a certain preferred embodiment has been shown and described, it should be understood that many changes and modifications may be made therein without departing from the scope of the appended claims.

What is claimed:

1. A spindle structure for a machine tool, comprising:
    a rotatable tubular shaft adapted to be coupled to a rotative drive source; and
    a spindle axially slidably disposed in said tubular shaft and rotatable in unison with said tubular shaft, said tubular shaft and said spindle being slidably held against each other through a layer of WC-base cemented carbide, comprising 12-18 wt % of Co, 4-6 wt % of C, 0.1-1.2 wt % of Fe, and 75-84 wt % of W.

2. A spindle structure according to claim 1, further including a bushing of steel interposed between said spindle and said tubular shaft, said bushing having a peripheral sliding surface with powder of the WC-base cemented carbide thermally sprayed thereon.

3. A spindle structure according to claim 1, wherein said spindle has an outer peripheral surface slidably held against said tubular shaft and having powder of the WC-base cemented carbide thermally sprayed thereon.

4. A spindle structure according to claim 1, wherein said tubular shaft has an inner peripheral surface slidably held against said spindle and having powder of the WC-base cemented carbide thermally sprayed thereon.

* * * * *